US008839050B1

(12) United States Patent
Shintani et al.

(10) Patent No.: US 8,839,050 B1
(45) Date of Patent: *Sep. 16, 2014

(54) METHOD AND APPARATUS OF ERROR REPORTING

(71) Applicant: Roku, Inc., Saratoga, CA (US)

(72) Inventors: Tomoko Shintani, Cupertino, CA (US); David Sharp, San Jose, CA (US)

(73) Assignee: Roku, Inc., Saratoga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/028,428

(22) Filed: Sep. 16, 2013

Related U.S. Application Data

(63) Continuation of application No. 13/778,088, filed on Feb. 26, 2013, now Pat. No. 8,539,286.

(51) Int. Cl.
*G06F 11/00* (2006.01)
*G06F 11/07* (2006.01)

(52) U.S. Cl.
CPC .................................. *G06F 11/0751* (2013.01)
USPC ............................................. 714/49; 714/48

(58) Field of Classification Search
USPC ....................................................... 714/48, 49
See application file for complete search history.

(56) References Cited

U.S. PATENT DOCUMENTS

| | | | |
|---|---|---|---|
| 7,966,393 B2 * | 6/2011 | Canann | 709/223 |
| 8,244,857 B2 * | 8/2012 | Jakob et al. | 709/224 |
| 8,339,968 B2 * | 12/2012 | Howe et al. | 370/242 |
| 2004/0205338 A1 * | 10/2004 | Bertin | 713/163 |
| 2004/0215698 A1 * | 10/2004 | Bertin | 709/201 |
| 2008/0141091 A1 * | 6/2008 | Kalluri | 714/748 |
| 2008/0162714 A1 * | 7/2008 | Pettersson | 709/231 |
| 2009/0031189 A1 * | 1/2009 | Munsell et al. | 714/758 |
| 2009/0138933 A1 * | 5/2009 | Marc et al. | 725/118 |
| 2009/0210550 A1 * | 8/2009 | Canann | 709/231 |
| 2010/0115085 A1 * | 5/2010 | Saffre et al. | 709/224 |
| 2011/0219258 A1 * | 9/2011 | Cooper et al. | 714/2 |

* cited by examiner

*Primary Examiner* — Joshua P Lottich
(74) *Attorney, Agent, or Firm* — Cooley LLP (57) ABSTRACT

A method includes receiving an error signal from a client device receiving a video stream. A portion of the video stream associated with the error signal is detected. An error selection listing based on the portion of the video stream is transmitted. The client device receives a selection based on the error selection listing. The selection is stored as an error listing.

5 Claims, 7 Drawing Sheets

METHOD AND APPARATUS OF ERROR REPORTING

CROSS REFERENCE TO RELATED APPLICATIONS

This application is a continuation of U.S. patent application Ser. No. 13/778,088 filed Feb. 26, 2013, the contents of which are incorporated herein by reference.

FIELD OF INVENTION

The invention generally relates to error reporting, and more particularly relates to error reporting in a streaming media environment.

BACKGROUND

Consumers have an increasing amount of on-demand media content available to them. For example, on-demand media content includes visual content (e.g., movies, television shows, still images), audio content (e.g., music) and software applications (e.g., games).

Along with an increasing amount of available on-demand content, consumers are becoming more dependent on the availability of their on-demand content. It can be disconcerting and disruptive to consumers when their on-demand content is not functioning properly.

SUMMARY

A method includes receiving an error signal from a client device receiving a video stream. A portion of the video stream associated with the error signal is detected. An error selection listing based on the portion of the video stream is transmitted. The client device receives a selection based on the error selection listing. The selection is stored as an error listing.

A system includes a client device configured to transmit an error signal while displaying a video stream. A platform server coupled to the client device is configured to receive the error signal associated with a portion of the video stream.

BRIEF DESCRIPTION OF THE DRAWINGS

The following figures depict various embodiments for illustrative purposes. From the figures and corresponding description, different embodiments may be employed without departing from the invention as described herein.

DETAILED DESCRIPTION

Figure 1:
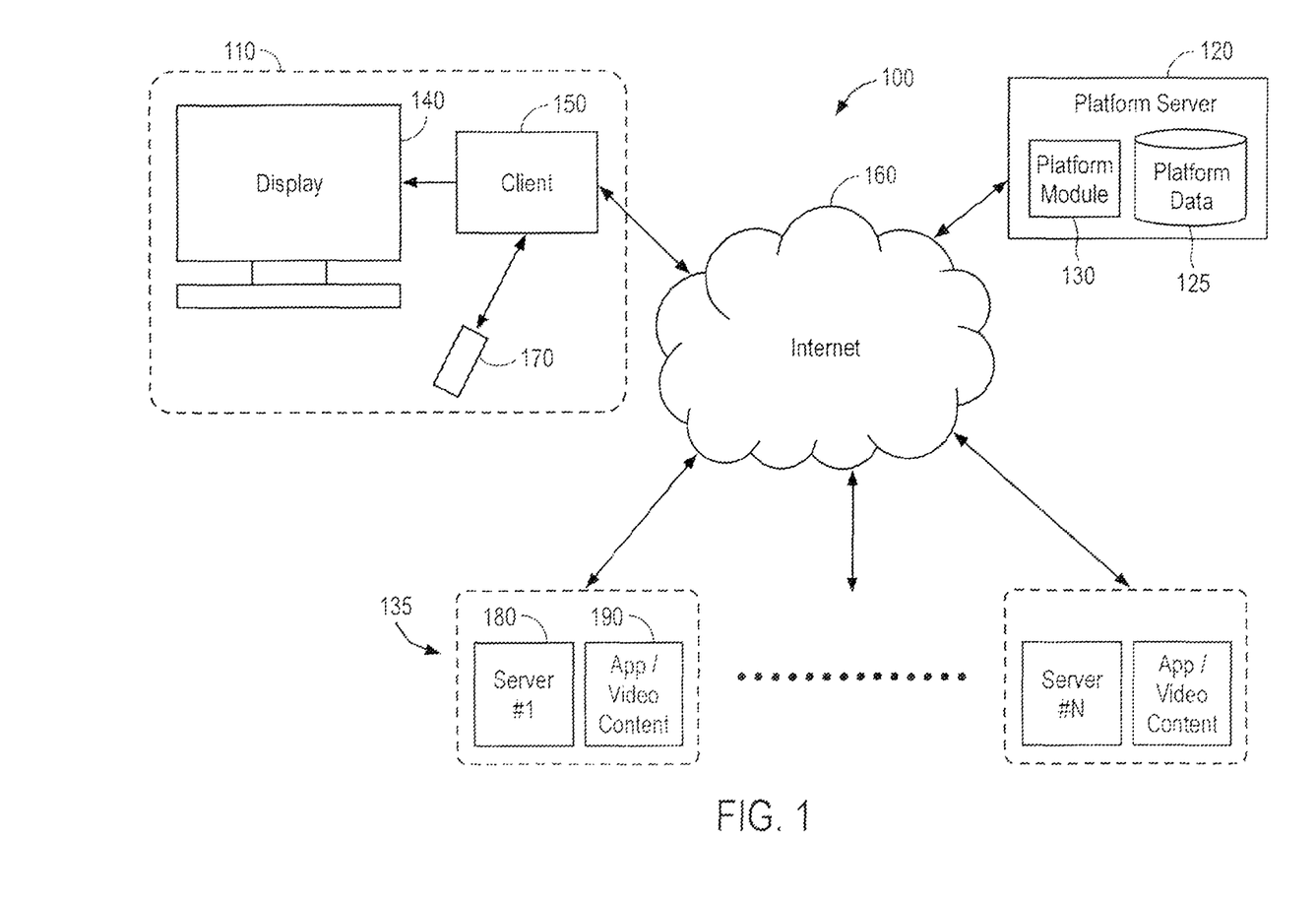
FIG. 1 illustrates a system configured in accordance with an embodiment of the invention.

FIG. 1 illustrates a streaming environment 100. The streaming environment 100 includes an interface system 110, a platform server 120 and one or more sources of content programming 135. In one embodiment, the interface system 110 includes a display device 140 (e.g., monitor or television), a client device 150 (e.g., streaming media player) and a user input device 170 (e.g., a remote control). The client device 150 is configured to communicate with the display device 140 and a network 160.

In one embodiment, the platform server 120 includes a database 125 with platform data and a platform module 130. The database 125 is configured to store data such as programming software packages. The data within these programming software packages include the network locations and content descriptions of content sources 135, hardware/software capabilities of different firmware versions and specifications of the client device 150, customer data associated with each client device 150 and user interface information associated with the client device 150.

In one embodiment, the customer data includes customer specific information, such as demographic data, geographic data, ISP identification and financial information. In one embodiment, the platform server 120 generates customized user interfaces for each of the client devices 150. In one embodiment, the user interface from the platform server 120 provides a selection of content such as audio, visual, and gaming content to the client device 150. In this example, the platform server 120 is configured to supply a graphical representation of available content to the client device 150. The client device 150 may select and access individual content through this graphical representation.

In one embodiment, the platform server 120 is configured to receive input from client device 150 and processes the input through the platform module 130. The input from the client device 150 includes navigation and selection commands which may represent selection of content, search for content, error reporting and ongoing interaction with an application running on the platform server 120.

In one embodiment, the client device 150 displays content on display device 140. In one embodiment, the content displayed on the display device 140 is sourced from one of the client device 150, the platform server 120 and the content source 135. In one embodiment, the input device 170 transmits signals to the client device 150. In one embodiment, the input device 170 utilizes one of or a combination of an infrared signal, radio frequency signal, and Bluetooth signal to communicate with the client device 150.

The input device 170 is configured to enter data and to make user selections from the interface as presented through the client device 150. In one embodiment, the interface displayed by the client device 150 may be from the platform server 120, from the content sources 135 or be locally generated by the client device 150. In one embodiment, the input device 170 also includes a display to show additional content. In another embodiment, the input device 170 includes a touch screen which allows content to be displayed and input to be received. Exemplary input devices 170 include remote controls, smart phones, tablets and mobile computers.

In one embodiment, the content sources 135 include a server 180 and a storage device with content 190. In one embodiment, the network address of particular content stored within the storage device 190 is maintained within the platform server 120. In another embodiment, the general location of the content source 135 is maintained and stored within the platform server 120 while the specific locations of corresponding content are managed locally by the content source 135. In yet another embodiment, the location of the content source 135 is embedded within the graphical representation displayed through the client device 150 such that interaction with the graphical representation through the client device 150 allows the content located within the content source 135 to be accessible to the client device 150.

In one embodiment, the content stored within the storage device 190 includes music, video, still pictures, text, graphics, gaming applications and the like. In one embodiment, the particular content which is stored within the storage device 190 is provided to the client device 150 through the network 160. In one embodiment, the network 160 is the Internet. In another embodiment, the network 160 is a local area network.

In one embodiment, the client device 150 makes a request for specific content. If the requested content is video content, the storage device 190 transmits video data that represents the specific video content to the client device 150 through the content source 135. In one embodiment, platform server 120 supports interfaces, such as login interfaces, search interfaces, and customized interfaces for the client device 150.

Figure 2:
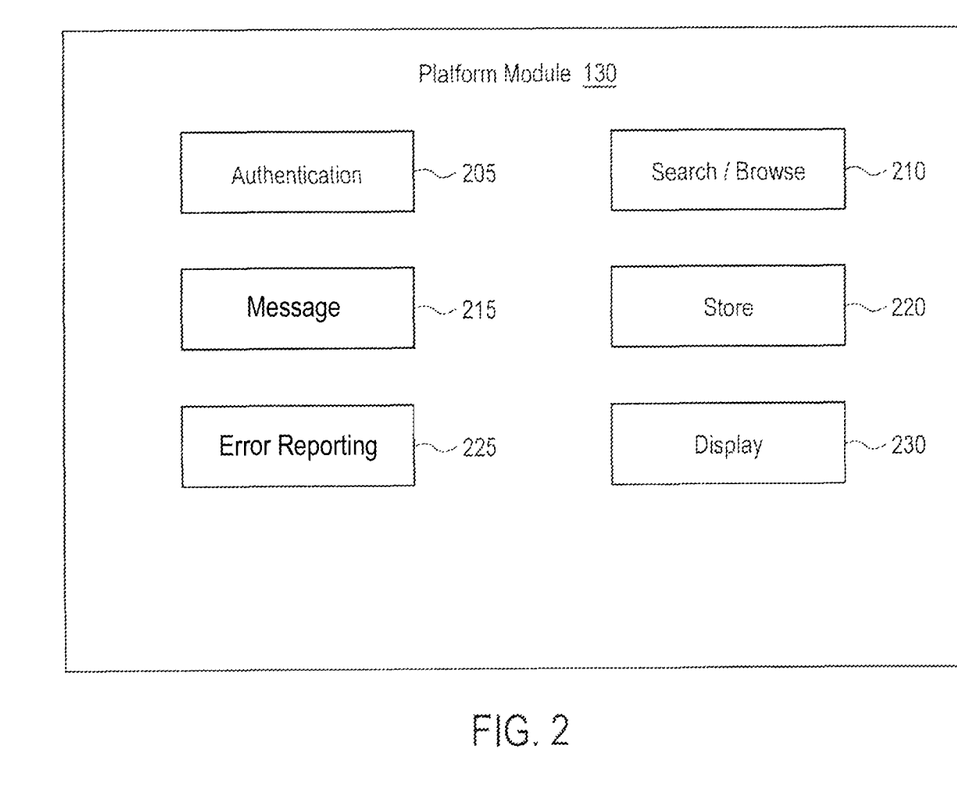
FIG. 2 illustrates server modules utilized in accordance with an embodiment of the invention.

FIG. 2 illustrates a representative platform module 130. In one embodiment, the platform module 130 includes an authentication module 205, a search/browse module 210, a messaging module 215, a store module 220, an error reporting module 225, and a display module 230.

The authentication module 205 interacts with the client device 150 and authenticates a profile or user account associated with the particular client device 150. For example, the profile includes data associated with a user such as the user name, password, device associations, IP addresses, location, email address, payment information and content subscriptions. In one embodiment, the authentication module 205 recognizes and authenticates the client device associated with a particular user account through password authentication, location authentication, visual authentication, or audio authentication. The authentication can be configured to occur when setting up a new client device 150, purchasing content or subscriptions or periodically as needed.

The search/browse module 210 is configured to detect input from a client device 150 and/or the input device 170. In one embodiment, the input represents the selection of a channel, content or application. In another embodiment, the input represents a textual, visual, or audible search for content, a channel or application. In yet another embodiment, the input represents browsing content, channels or applications.

The message module 215 coordinates messaging activities such as sending messages related to the error reporting module 225. In one embodiment, these messages are sent to a client device 150, to a mobile phone, to an email account or to a voicemail.

The store module 220 coordinates the storage of data within the platform server 120. The data coordinated by the store module 220 includes content listings and corresponding descriptions, user profiles, error reporting, searching and browsing requests, content viewed, channels and applications utilized, tags and friends. Depending on the nature of the data, access to the content is controlled to prevent unauthorized use.

The error reporting module 225 coordinates the creation and use of error tags associated with content, channels and applications. Error tags can be assigned to channels and applications by users through the client device 150. Error tags can also be assigned to portions of audio and video streams by the user of the audio and video streams through the client device 150. The error tags may describe a problem with viewing or using the corresponding content. Representative problems include poor video or audio quality, disruption of streaming video or audio, inability to initiate content and the like.

The display module 230 coordinates display of representative content and user interfaces from the platform server 120 to each of the client devices 150. Examples of representative content include listings and descriptions of channels, error messaging, content and applications. Further, the user interface is configured to allow searching, browsing and selection for channels, content and applications.

Figure 3:
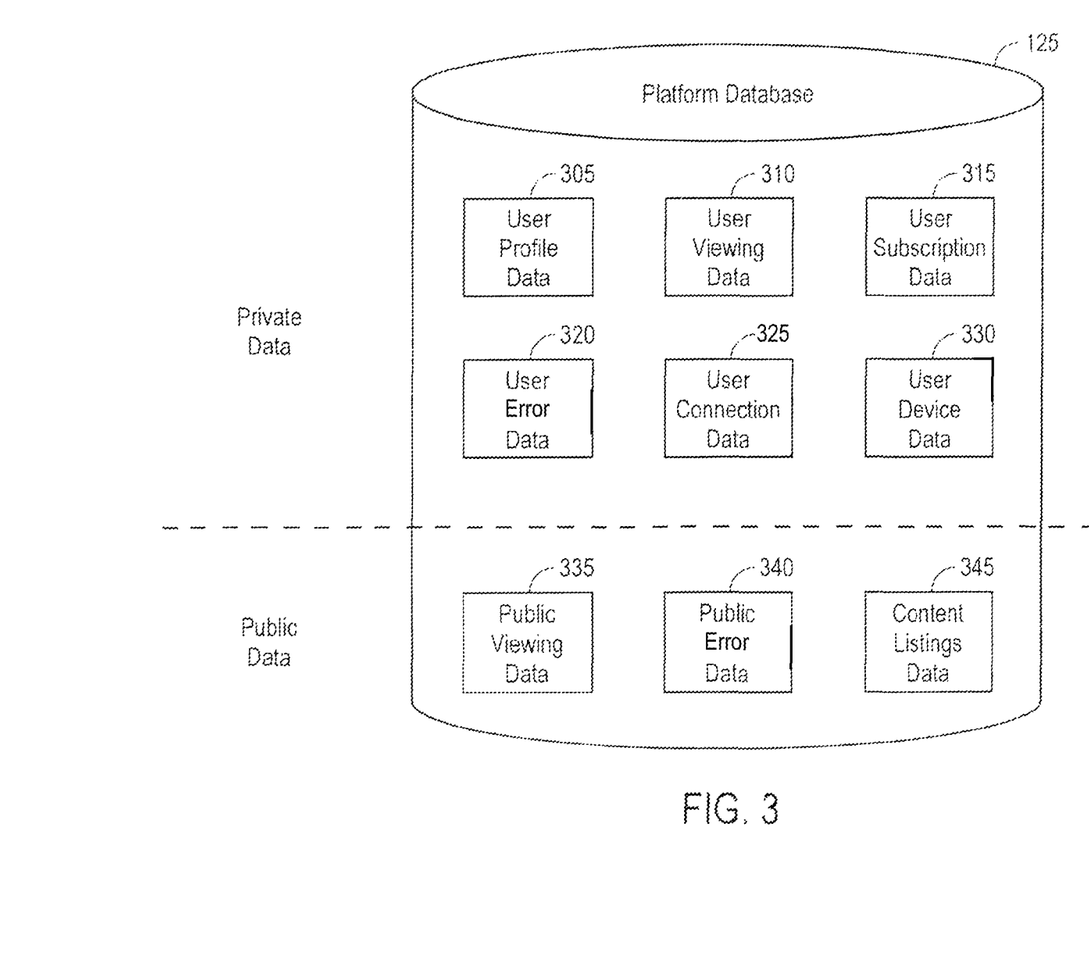
FIG. 3 illustrates server data utilized in accordance with an embodiment of the invention.

FIG. 3 illustrates a representative platform database 125. In one embodiment, the platform database 125 includes private data and public data. The private data contains information which is associated with a particular user; the public data contains information that is aggregated and not associated with a particular user. The private data within the platform database 125 includes user profile data 305, user viewing data 310, user subscription data 315, user error data 320, user connection data 325 and user device data 330. The public data within the platform database 125 includes public viewing data 335, public error data 340, and content listing data 345.

In one embodiment, utilization of the private data is restricted to access within the platform server 120 and access by the particular user corresponding to the private data. Utilization of the public data can be accessed by all users and selected third parties.

The user profile data 305 includes information such as a user's name, address, credit card/payment information, age and gender. The user viewing data 310 includes the channels, audio content, visual content, video content and applications utilized through a client device 150. In one embodiment, the user viewing data 310 allows a client device 150 that is associated with the particular user to view recently watched channels and content as well as determine which applications were recently used. Further, the user viewing data 310 also includes stored searches that are performed through devices associated with this user account. In one embodiment, the stored searches are initiated by explicitly searching for content through a text based, image based or voice based search. In another embodiment, the stored searches are implicitly identified by recording browsing choices. The user subscription data 315 includes information such as channels subscribed by a particular user and content and applications purchased by the particular user.

The user error data 320 includes error information related to a particular channel, application or content experienced through a client device 150. For example, the error information can include a user's comment or description of the error pertaining to a channel, application or content. Further, the error information can also describe the location of the error within the channel, content or application. In one embodiment, the entire content is tagged with a description as determined by the particular user. In addition, any further action regarding the error such as further notification upon correction of the error can also be noted within the user error data 320.

The user connection data 325 includes a listing of other users that are associated with the particular user as a friend. In one embodiment, having users connected to each other as friends allows a particular user to share recently watched content, channel subscriptions, user tags and applications with other connected users. The user device data 330 includes a listing of devices associated with the particular user. The devices may include a client device 150, an input device 170 and a mobile device such as a tablet, laptop computer or smart phone.

The public viewing data 335 includes a listing of channels, content, and applications utilized by many users. In one embodiment, the popularity of the content is ranked based on the number of viewers and the order in which the content is viewed. For example, the higher number of views per day for content would indicate higher popularity. Further, when multiple content entities are presented next to each other, the content entity which is selected first for viewing is given a higher popularity rating.

The public error data 340 includes error information related to a particular channel, content or application reported by many users and/or content providers. In one embodiment, the error information within the public error data 340 comes from content providers when they know of an error. Further, the error information within the public error data 340 comes from users when they encounter an error.

The content listings data 345 includes listings of content and descriptions of the corresponding content. In one embodiment, the descriptions include key word tagging throughout the content, a summary description of the content, directors and actors associated with the content and third party reviews associated with the content.

Figure 4:
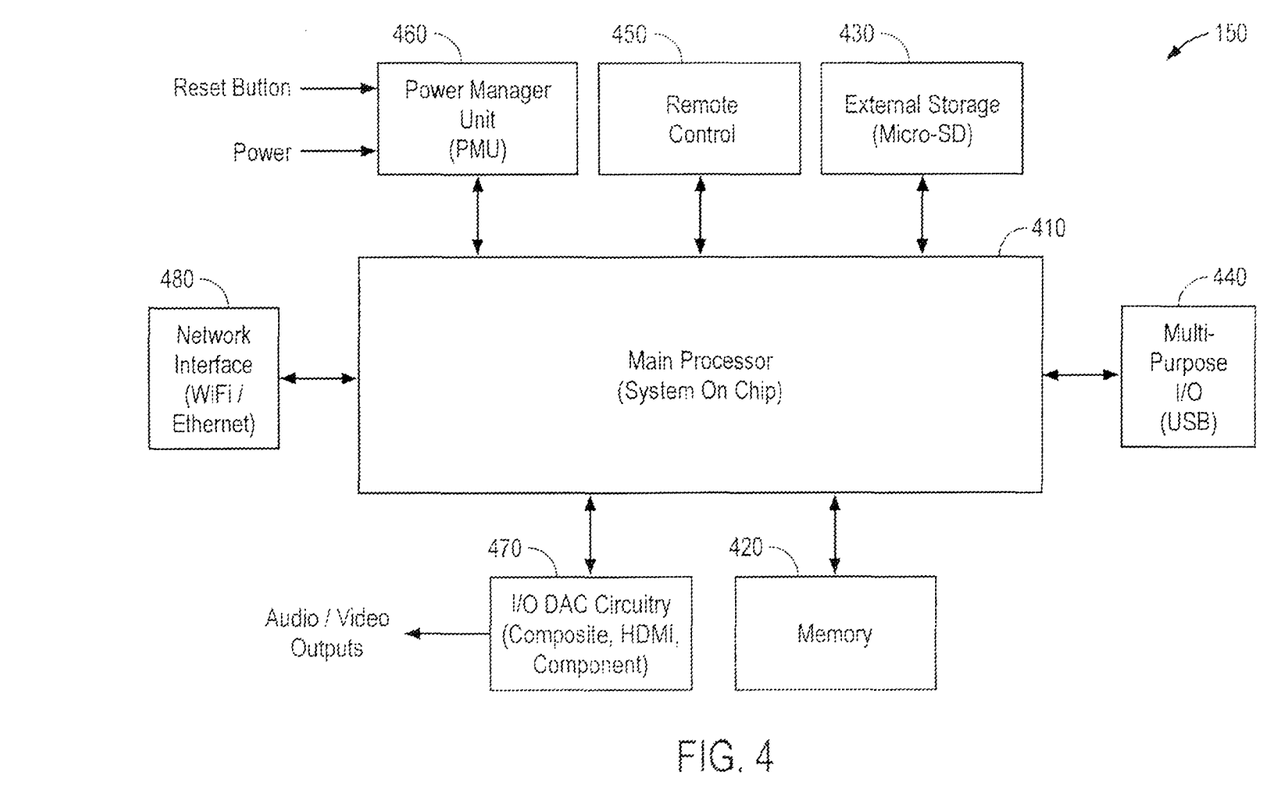
FIG. 4 illustrates a streaming media client device configured in accordance with an embodiment of the invention.

FIG. 4 illustrates a block diagram of a representative client device 150. In one embodiment, the client device 150 is configured to receive streamed content. The content streamed into the client device 150 may include audio content, visual content and applications. In one embodiment, the client device 150 is utilized to transmit instructions and selections to the content server 135 and/or the platform server 120.

In one embodiment, the client device includes a processor 410, internal memory 420, external storage 430, multipurpose I/O port 440, input device interface 450, power management 460, audio/visual I/O interface 470 and network interface 480.

In one embodiment, the processor 410 utilizes a central processing unit (CPU). In another embodiment, the processor 410 also utilizes a graphics processing unit (GPU) which may be integrated with the CPU or be configured to be physically separate. In one embodiment, the internal memory 420 includes one of or a combination of random access memory (RAM), flash memory and read only memory (ROM). Additional memory and memory interfaces such as the multipurpose I/O port 440 may be provided in various embodiments to support memories, such as the external storage 430 which can include hard disks, Universal Serial Bus (USB) drives, Secure Digital (SD) cards and the like. These memories may also be used for storage of applications, programs, buffered media, media, executable computer code and software keys.

In one embodiment, the input device interface 450 enables an input device to interface with the client device 150. In one embodiment, the input device interface 450 is configured to communicate with the input device through a wireless interface such as Bluetooth (BT), radio frequency (RF), and infrared (IR). In one embodiment, the input device interface 450 supports the functionality through an input device including any combination of virtual buttons embodied on a customization screen, physical buttons, accelerometer, gyroscope, pressure sensor, tilt sensor, magnetic sensor, microphone and light sensor.

In one embodiment, the I/O interface 470 supports multiple video output options such as High Definition Multimedia Interface (HDMI), Red-Green-Blue (RGB) component video, Separate Video (S-video), Digital Visual Interface (DVI), Video Graphics Array (VGA), Mobile High-Definition Link (MHL) and composite video. In one embodiment, USB and Apple® Thunderbolt® enabled displays are also supported.

In one embodiment, the network interface 480 supports multiple network interfaces such as Ethernet, Wi-Fi, and Bluetooth. In another embodiment, the network interface 480 also supports coaxial, digital TV antenna and satellite television.

Figure 5:
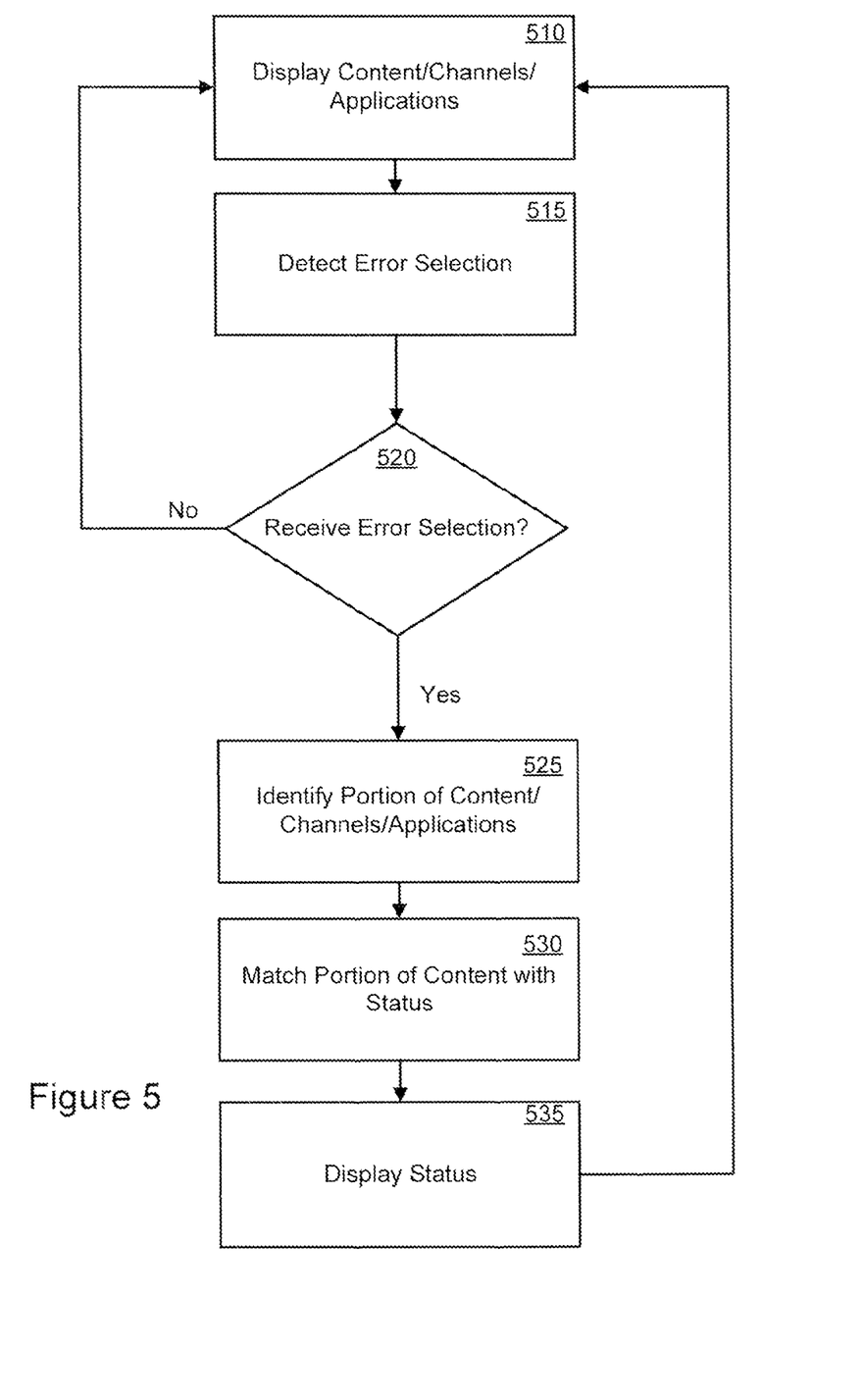
FIG. 5 illustrates processing operations associated with an embodiment of the invention.

FIG. 5 illustrates reporting errors related to content, channels and/or applications. In Block 510, content, channels and/or applications are displayed through the client device 150. In one embodiment, the content being displayed through the client device 150 includes audio, videos and still images. The channel presented through the client device 150 includes multiple pieces of content aggregated by the channel. The applications presented through the client device 150 include software applications relating to games, tools and viewers for viewing content.

In Block 515 an error selection is detected. In one embodiment, the error selection flows through either the client device 150 or the input device 170. For example, the client device 150 or the input device 170 can be utilized either as the origination point of the error selection input or a receiving point for the error selection input from another device.

In Block 520, if the error selection is not detected, then display of content, channels and applications continue within the Block 510. In Block 520, if the error selection is detected, then additional details of the error selection are discovered within the Block 525. In one embodiment, the portion of the content associated with the error selection is identified. In another embodiment, the channel associated with the error selection is also identified. In yet another embodiment, the application associated with the error selection is also identified.

In Block 530, the identified portions of content, channel or application characterized by Block 525 are matched with updated status of the portions of content, channel, or application as stored within the platform database 125. In one embodiment, the status of the portions of content, channel or application are stored within the public error data 340. In one embodiment, the status for a particular piece of content includes normal operation, a portion of the content has an error and the entire content has errors. In one embodiment, the status for a particular channel includes normal operation, specific content within the channel has errors and the entire channel has errors. In one embodiment, the status for a particular application includes normal operation, specific functionality having an error and the entire application has errors. The status can dynamically change based on the operation of the content, channel or application.

In one embodiment, the public error data 340 collectively stores error data associated with specific content, channels and applications. For example, the public error data 340 includes error selections from multiple users. In one instance, if there are multiple reports of an error in playing back a particular movie at a particular location, then the public error data 340 may indicate that the particular movie has an error at the particular location. In another instance, if there are multiple reports of an error in playing back a particular movie at multiple locations around the same time frame, then the public error data 340 may indicate that the particular movie has an error. In another instance, if there are multiple reports of an error in playing back multiple movies associated with the same channel around the same time frame, then the public error data 340 may indicate that the channel has an error.

Figure 7:
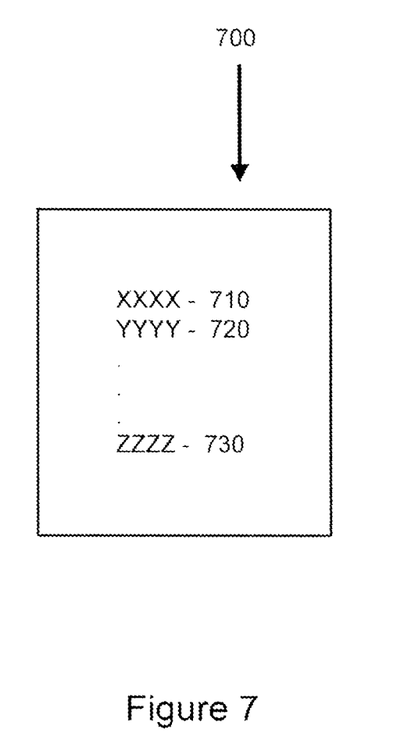
FIG. 7 illustrates status recommendations utilized in accordance with an embodiment of the invention.

In Block 535, the status of the content, channel or application is displayed. In one embodiment, the display of the status includes displaying multiple status recommendations. For example, the status recommendations are presented in a drop down menu 700 shown within FIG. 7 with status recommendations 710, 720, and 730. Any number of status recommendations can be displayed. In one embodiment, the displayed status recommendations represent the most likely status of the corresponding content, channel or application as identified within Block 530.

Figure 6:
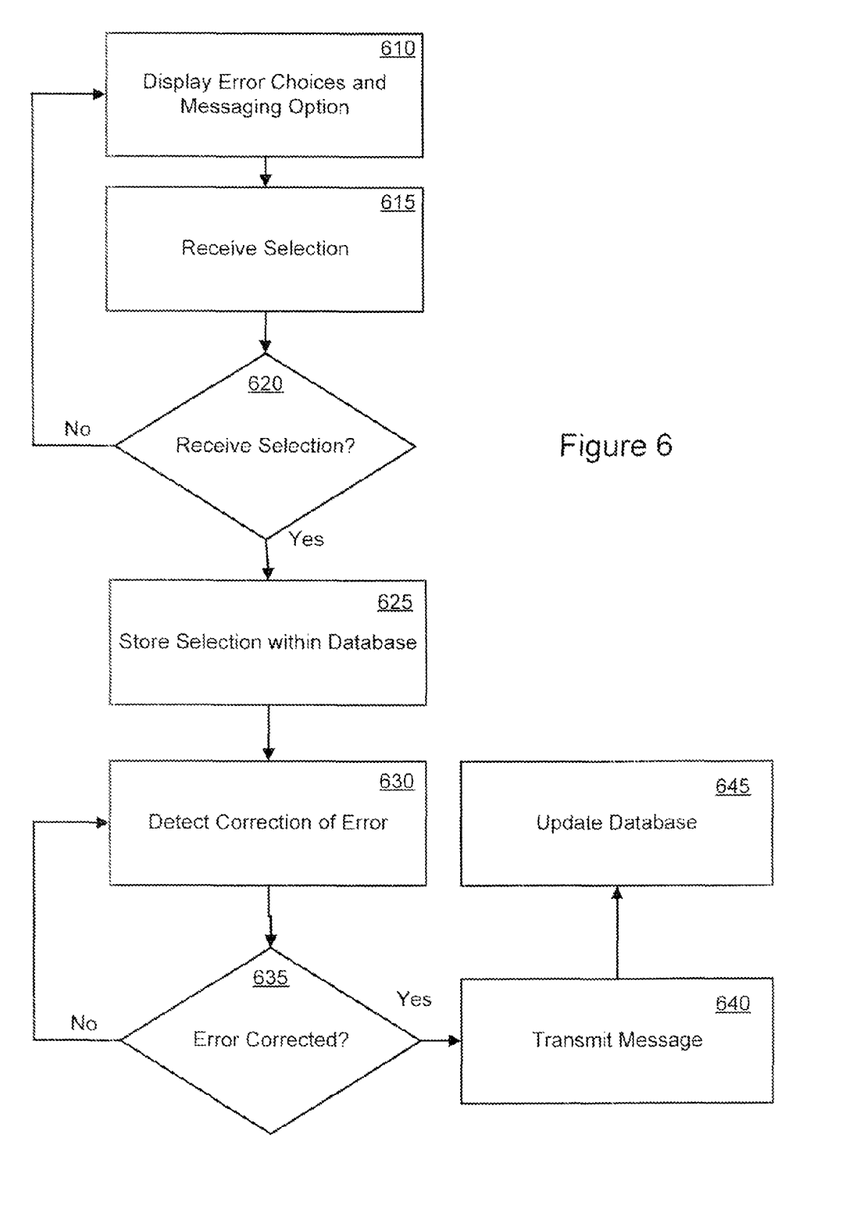
FIG. 6 illustrates processing operations associated with another embodiment of the invention.

FIG. 6 illustrates reporting errors related to content, channels and/or applications while experiencing the errors through a client device 150 or input device 170. This embodiment leverages the platform server 120 to track errors. Further, errors reported by or through the client device 150 or input device 170 are stored within the platform server 120. In Block 610, at least one status recommendation is displayed relating to content, channels and/or applications associated with content being displayed through the client device 150. In one embodiment, the content being displayed through the client device 150 includes audio, videos, and still images as identified through the Block 535. In one embodiment, a plurality of status recommendations are displayed within a drop down menu for display though the client device 150. In one embodiment, the plurality of status recommendations are selected for display as the most likely choices based on data from the platform server 120.

In Block 615, a selection of the status recommendation is received. In one embodiment, the input device 170 initiates the selection of the status recommendation. If the selection is received, then the selection is stored within Block 625. In one embodiment, the selection is stored within the public error data 340. In another embodiment, the selection is stored within the user error data 320. If the selection is stored within the public error data 340, the selection is available for use by others when displaying error choices within the Block 610 and matching the status within the Block 530. For example, the selection of the status for corresponding content, application or channel can be captured and utilized in aggregate without identifying the individual account making the selection.

In Block 630 correction of the error is detected. In one embodiment, the error associated with the content, channel or application is corrected and is detected within the Block 620. The error can include loss of content being streamed, loss of access to a channel or application.

If the error is corrected and detected within Block 635, then a notification is transmitted to the corresponding user account associated with the error in Block 640. In one embodiment, the notification is in the form of an electronic mail message, an SMS text message, or a textual message through the client device 170. In one instance, the user account can specify the type of notification to be provided upon correction of the error.

In Block 645, the platform database 325 is updated to reflect correction of the error as confirmed in the Block 635. In one embodiment, the user error data 320 and/or the public error data 340 within the platform database 325 is updated.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A system, comprising:
    a platform server configured for connection to a client device that coordinates the display of a video stream, wherein the platform server is configured to
        receive from the client device an error signal associated with a portion of the video stream,
        transmit an error selection listing to the client device, wherein the error selection listing includes at least one of unavailable content, unavailable audio, unavailable video, poor quality audio, poor quality video and re-buffering problems,
        receive from the client device a selection based on the error selection listing, and
        store the selection.

2. The system according to claim 1, wherein the platform server is configured to transmit a success signal when the portion of the video stream is operating normally.

3. The system according to claim 2, wherein the success signal is a message transmitted to the client device.

4. The system according to claim 2, wherein the success signal is a text message transmitted to a phone number associated with an account corresponding to the client device.

5. The system according to claim 2, wherein the success signal is an email message transmitted to an email account associated an account corresponding to the client device.

\* \* \* \* \*